Aug. 31, 1926.
W. H. SNYDER ET AL
1,598,022
FOCUSING AND EXPOSURE METER
Filed Nov. 24, 1922
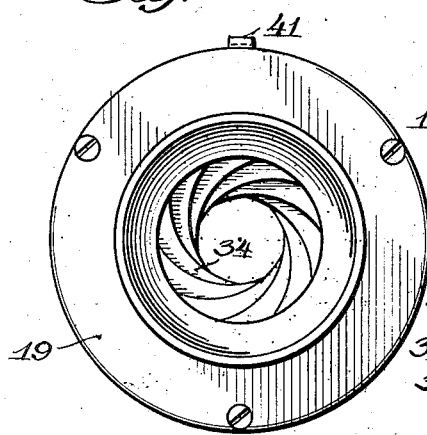
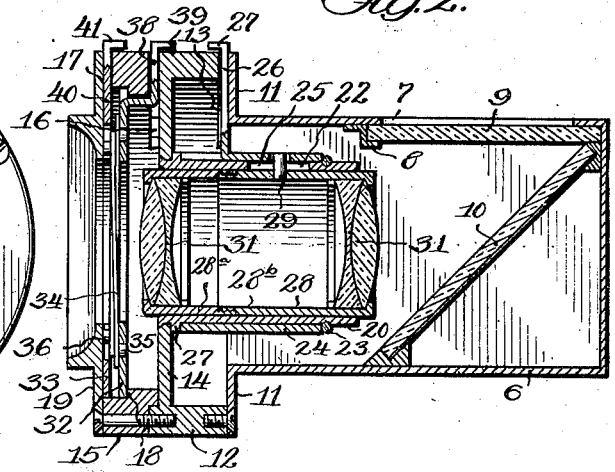
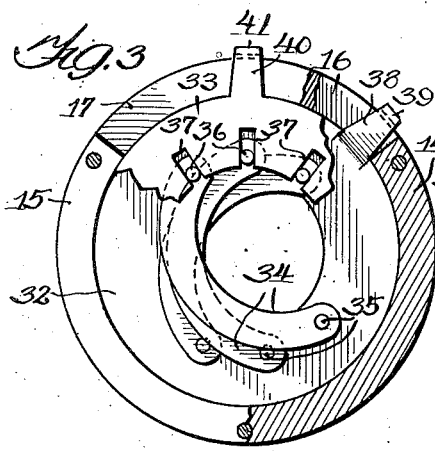
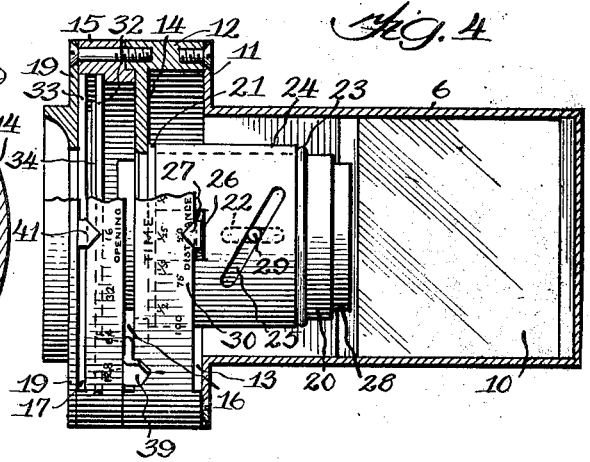
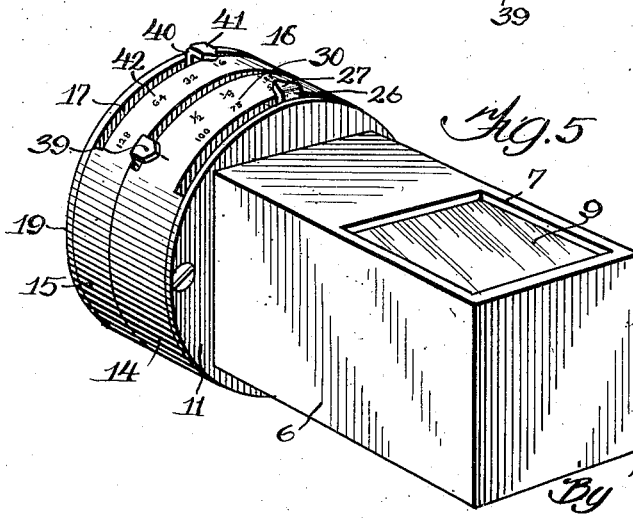
Inventors:
Ward H. Snyder,
Frank F. Farkas
By Benjamin,
Rosebourgh
& Lundy Attys

Patented Aug. 31, 1926.

1,598,022

UNITED STATES PATENT OFFICE.

WARD H. SNYDER AND FRANK F. FARKAS, OF CHICAGO, ILLINOIS.

FOCUSING AND EXPOSURE METER.

Application filed November 24, 1922. Serial No. 602,943.

Our present invention relates to the provision of a focusing and exposure meter for use in connection with photography. It is well known that with any photographic lens objects located at and beyond a certain point in front of the lens are in clear focus when the lens is positioned its focal length from the photographic plate. In order to clearly focus objects nearer to the lens than the point referred to (usually called the universal focus distance) the lens has to be withdrawn from the plate a distance greater than its focal length, the amount of which withdrawal depends upon the focal length of the lens and the distance of the object to be photographed from it. With very near objects the amount of withdrawal of the lens from the plate is relatively considerable. It is also well known that the amount of illumination from any source varies with the distance from the source of illumination, the law being usually stated, that the illumination varies inversely as the square of the distance. It will be seen from the foregoing that when it is necessary to focus a camera, and unless the diaphragm opening and timing or length of exposure be changed, the amount of light reaching the photographic plate will also be changed.

In order to co-relate diaphragm openings of lenses of different focal length a system has been devised which designates the diaphragm opening not in its extent but in the ratio of the diameter of the diaphragm opening to the focal length of the lens with which it is being employed.

We have heretofore disclosed in our Letters Patent of the United States, dated March 6, 1923, No. 1,447,906, the possibility of co-relating length of exposure with diaphragm opening so that the length of exposure may be judged from the degree of the illumination of the image, but the system therein disclosed took no account of the change of illumination due to focusing. It is our present object to provide an instrument which will indicate the distance at which a camera should be focused to properly define a given object from the location from which the picture is to be taken, and with this condition defined will permit the ascertainment of diaphragm opening and time of exposure in a suitable relation to obtain a good picture.

It will hereafter be seen that if because of the movement of the object the time must necessarily be short, a desired speed may be selected and the instrument will show the extent to which the diaphgram may be safely closed to secure definition; and, on the other hand, if definition is the important thing, the diaphragm may be closed sufficiently to secure the desired definition and the instrument will then show how quickly the exposure may safely be made. It will also be hereinafter seen that our structure may be made in a unitary article of manufacture which may be easily carried in the pocket and employed in the field for ascertaining distance, diaphragm opening and time exposure for any cameras as are now obtainable upon the market, or the device can be directly built into the camera, if it is desired so to do. We attain the foregoing objects by means of the structure illustrated in the accompanying drawings, in which—

Fig. 1 is a front elevation of the structure embodying our invention.

Fig. 2 is a central vertical longitudinal section thereof.

Fig. 3 is a front elevation, the front wall being removed and a portion of the front diaphragm annulus broken away.

Fig. 4 is a top plan, partially in horizontal section, showing particularly the relation of the controls, and Fig. 5 is a perspective from the rear and to one side of the device.

Similar reference characters refer to similar parts throughout the respective views.

The structure in which our invention is embodied comprises a rectangular elongated casing 6, in the rear of the top whereof is provided a rectangular sight opening 7, directly beneath which is mounted in channels 8, or in any other suitable manner, a glass 9 with a ground or frosted surface. Directly below glass 9, and preferably at an angle of forty-five degrees therewith, is mounted a suitable reflecting element 10 which may be a piece of silvered glass.

The forward end of casing 6 is laterally extended to form a circular or annular flange 11. Secured to the front of annular flange 11 is a ring or cylindrically shaped member 12, the rear top edge of which is cut away adjacent flange 11 to form a segmental slot 13, the functioning whereof is to be hereafter described. Slightly back of the forward end of ring or cylinder 12 is an inwardly extending centrally perforated web 14 in which is secured the lens mounting, hereinafter to be described, and a portion of the cylinder or ring 12 in front of web 14 is cut away. To the forward edge of ring or cylinder 12 is secured a second ring or cylinder 15. The adjacent rear face of ring or cylinder 15 is cut back opposite the cut away portion of ring 12 to register therewith and provide a slot 16, and the opposite edge of said ring 15 is also cut back to provide another slot 17. The ring or cylinder 15 is also interiorly cut out adjacent its forward face to form an annular shoulder 18 between which and the front of ring 15 is sufficient space to install the diaphragm mechanism, hereinafter to be described. To the front face of the forward ring or cylinder 15 is secured the centrally apertured front plate 19.

The lens mounting heretofore referred to comprises an intermediate tube 20 having a shoulder 21 adjacent the front end. The forward end of this tube 20 is inserted and fixedly secured into the central aperture in web 14. The top of the intermediate tube 20 back of the annular shoulder 21 is provided with a slot 22 arranged longitudinally of its length. Adjacent its rear end tube 20 is provided with an exterior circumferential groove to receive a split retaining ring 23 between which and shoulder 21 is revolvably mounted a tubular collar 24 having a slot 25 disposed diagonally with respect to slot 22 in tube 20. Extending laterally from the forward edge of tubular collar 24 is a tongue 26 which projects through slot 13, and the end whereof is bent forward and pointed to provide an indicator 27. The lens, itself, is mounted in an interior tube 28, which slides longitudinally of tube 20, and is provided with a fixed pin 29 which extends outwardly into engagement with slots 22 and 25.

It will now be seen that when the pointer or indicator 27 is oscillated in slot 13 it will rotate tubular collar 24, which, through the action of the diagonal slot 25, will force pin 29 backwards and forwards in slot 22, thereby moving the lens nearer to or farther from the ground or frosted surface of glass 9. Directly below the pointer or indicator 27 is provided a scale 30 which shows in linear measurement the distance in front of the lens in which objects will be in critical focus with the relation of lens and ground glass secured by the different positions of the indicator or pointer 27.

We have schematically shown the lens tube 28 to be formed of anterior and posterior portions 28ª and 28ᵇ, respectively, which are screwed together and in opposite ends of which are mounted lens doublets 31, but any desired lens construction may be employed without in any way altering the principles of operation of our invention.

The diaphragm, which is installed between shoulder 18 of ring 15 and front plate 19, comprises centrally apertured disks 32 and 33, and a series of segmentally shaped plates, leaves or blades 34. The plates, leaves or blades 34 are pivoted with suitable studs 35 to the inner plate 32 at one end, and at their other ends are provided with laterally extending pins or pintles 36 which engage with slots 37 extending radially from the central opening of the front or forward disk 33. It will be seen that the rotation of either disk will change the relation of the plates, leaves or blades 34 to the central openings of disks 32 and 33, and that the disks may be operated either together or independently to close or enlarge the central openings. The rear disk 32 is provided with a tongue or arm 38 which is formed to extend through slot 16, and the end whereof is formed into an indicator or pointer 39, in all respects similar to the indicator or pointer 27. Directly under the pointer 39 is a scale showing the time which should be given with the different arrangements of this pointer, which will secure a sufficient illumination of the image upon glass 9. The disk 33 is provided with a tongue or arm 40, which extends through slot 17, and is similarly formed into a pointer or indicator 41, under which is a scale 42 showing the relation between diaphragm opening and length of focus in any of the systems or schemes of notation now employed for that purpose.

It is believed to be preferable, and is therefore suggested, that our apparatus be manipulated as follows:

First, set the diaphragm and time indicator arms so as to secure the widest possible diaphragm opening. Next, bring the image to critical definition by manipulation of the distance indicator arm. This, as heretofore explained, will secure the proper separation between lens and image for the object it is desired to photograph and will show by the indicator arm and its scale at what distance the camera should be set on its own distance scale. Adjustments of diaphragm and timing arms cannot be made before the distance adjustment is made as, has been previously explained, the separation between lens and image effects the quantity of light reaching the image.

After the distance adjustment has been made, and if the time in which the exposure is to be made is important, then set the timing indicator arm to the desired time on its scale. If the image is rendered too dark and obscure by this setting, it will show at once that a satisfactory exposure cannot be made under the then existing light conditions in the time desired. If, on the other hand, the image is brilliant after the time setting has been made, manipulate the diaphragm index arm until the brilliancy of the image is reduced to an average illumination. The numbers shown by the arms on the distance, time, and diaphragm scales may then be employed for setting like adjustments on the camera.

If an extremely short exposure is not necessary in the particular case, it is, nevertheless, desirable to use the automatic timing mechanism provided on the better grade of modern photographic shutters in order to secure the advantages of the accuracy of these mechanisms, and it is suggested that the timing arm of our device be set at one of the intervals provided by the timing mechanism on the camera shutter and that the diaphragm arm be then manipulated as in the case above described when a very brief timing is requisite. It is, of course, desirable to give maximum timing with as much stopping down as possible to improve the detail in the shadows.

What we claim as new is:—

1. A focusing and exposure meter for pre-determining distance, diaphragm opening, and time of exposure in photographing, comprising a lens and element for visably receiving the image formed by said lens, means for causing a relative movement between said lens and said element, and a plurality of independently operable diaphragm elements for controlling the passage of light through said lens.

2. A focusing and exposure meter comprising a lens, an element for visably receiving the image formed by said lens, means for causing a relative movement between said lens and said element, and a diaphragm co-operating with said lens having a plurality of independently movable controls and independent indicators for each of said diaphragm controls being provided respectively with time and diaphragm indicia.

3. An image receiving element, and a lens for focusing an image thereon, means for relatively moving said devices to produce such an image, a distance scale associated with said means, independent devices controlling the quantity of light passing through said lens, time and diaphragm scales associated with said respective devices whereby distance, diaphragm, adjustment and exposure period are indicated upon said structure and co-operatively related.

4. A focusing and exposure meter comprising a casing provided with a cylindrical portion having three adjacent parallel slots therein, distance, time and diaphragm scales associated with said respective slots, a lens, and devices for controlling the passage of light therethrough mounted within said casing, and arms for moving said lens, and said devices extended through said slots into co-operative relation with said scales whereby the inter-relation of focus, time and diaphragm adjustment are displayed in adjacent parallel relation through their individual and combined effect upon said image.

Signed at Chicago, county of Cook and State of Illinois, this 20th day of November, 1922.

WARD H. SNYDER.
FRANK F. FARKAS.